May 18, 1965

D. G. RODDICK 3,183,708

METHOD AND APPARATUS FOR METERING PRESSURE
PHENOMENA IN INTERNAL COMBUSTION ENGINES

Filed Oct. 12, 1961

INVENTOR:
D. G. RODDICK

BY: *Theodore E. Biber*

HIS ATTORNEY

May 18, 1965　　　　　D. G. RODDICK　　　　3,183,708
　　　METHOD AND APPARATUS FOR METERING PRESSURE
　　　　PHENOMENA IN INTERNAL COMBUSTION ENGINES
Filed Oct. 12, 1961　　　　　　　　　　3 Sheets-Sheet 3

INVENTOR:
D. G. RODDICK
BY:
HIS ATTORNEY

United States Patent Office 3,183,708
Patented May 18, 1965

3,183,708
METHOD AND APPARATUS FOR METERING PRESSURE PHENOMENA IN INTERNAL COMBUSTION ENGINES
Douglas G. Roddick, Lafayette, Calif., assignor to Shell Oil Company, New York, N.Y., a corporation of Delaware
Filed Oct. 12, 1961, Ser. No. 144,706
2 Claims. (Cl. 73—35)

This invention pertains to a method and apparatus for determining the intensity of pressure phenomena in an internal combustion engine and includes a method and apparatus for determining precisely by means of electronic instruments when an engine is detonating or knocking.

The presently used instrument for determining the octane rating of various fuels consists of a magnetostriction transducer which determines the rate of pressure change within the cylinder. The signal from the magneto-striction transducer is then amplified and if any portion exceeds a threshold level it is used as an indication of the presence of a knocking or detonating condition within the engine. This system was developed as an electronic counterpart of the previously used manual or aural means for determining when an engine was detonating.

While the presently used electronic system is an improvement over the above-mentioned aural means, it has several deficiencies. As explained above, the present instrument first generates a signal that varies as the rate of change of pressure within the cylinder and then uses the excess of this signal over a threshold level to indicate the intensity of knocking within the engine. Thus, it is easily seen that two fuels which have different rates of combustion within the cylinder and thus produce different rates of pressure increase could show entirely different octane ratings though actually be of substantially the same antiknock quality. This difference in octane ratings is particularly bad in the case of aromatic type fuels that may be rated much lower than they actually are using the present system. Even though aromatic fuels are rated lower an examination of the pressure changes occurring within the cylinder by means of an oscilloscope or the like may show a complete absence of knock even when the present instrument indicates a knocking condition. This phenomena of indicated knock where none actually exists is known as knockless knock.

In addition to the above difficulty the present system is seriously handicapped by the inability to be accurately calibrated against an absolute standard in setting the threshold level that determines whether knock is present within the engine. The required threshold level varies greatly with different engine adjustments and different combustion rates of fuels. At present, it is substantially impossible to correlate these factors so that reproducible results may be obtained by two separate operators of the instrument.

Accordingly, it is the principal object of this invention to provide a new method and apparatus for accurately determining pressure phenomena within the cylinder of an internal combustion engine.

A further object of this invention is to provide a new method and apparatus for accurately determining the presence of detonation or knocking within the cylinder of an internal combustion engine.

It is a further object of this invention to provide a unique method and apparatus that determines the presence of knocking or detonation in a cylinder by measuring the difference between the first and second derivatives of a signal that varies directly with the pressure present within the cylinder.

This invention is based on the discovery that under no-knock conditions the peak value of the second derivative of the pressure signal varies linearly with the peak value of the first derivative of the pressure signal. At the onset of a knocking condition the second derivative increases at a much faster rate than the first derivative. This invention utilizes this discovery by measuring the difference between the first and second derivative peak values. In the absence of detonation or knocking within the cylinder, the measurement is zero while at the onset of knocking the measurement assumes a positive value which increases rapidly with increasing knock intensity.

The above description of linear relation between the peak values of the first and second derivatives of a pressure signal is substantially true regardless of the fuel mixture used or the engine conditions. Thus, even for aromatic type fuel mixtures the peak values of the first and second derivatives will maintain a linear relationship until the onset of detonation. At this point the peak value of the second derivative will assume a much larger value than the peak value of the first derivative thus the difference between the two will indicate the presence of knocking.

The apparatus of this invention utilizes a piezo crystal type detector to generate an electrical signal that is directly related to the pressure exising within the cylinder. This signal is then differentiated to obtain the first derivative which is subsequently differentiated to obtain the second derivative. Both the first and second derivatives are supplied to peak reading amplifiers that average the positive peak value of the first and second derivatives over a few cycles of engine operation. In addition, the two peak reading amplifiers adjust the amplitude of the first and second derivative signals so that they have substantially equal values under knock-free conditions. The two amplifier signals are then supplied to a difference measuring device such as a difference amplifier or a vacuum tube voltmeter where the difference between the two derivatives is measured. Of course, the difference between the two signals in addition to being measured can also be recorded to obtain a permanent record of the engine operation.

The above objects and advantages of this invention will be more easily understood from the following description of a preferred embodiment when taken in conjunction with the attached drawing in which.

Figure 1:
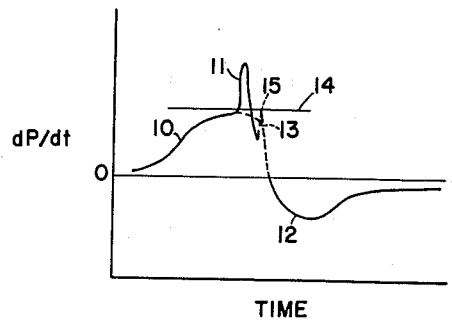
FIGURE 1 is a curve for a single engine cycle showing the variation of the first derivative of the pressure with time.

Referring now to FIGURE 1, there is shown a curve of the first derivative of the pressure with respect to time. This curve is for approximately one combustion cycle of an engine and is filtered to remove oscillations. It is noted that the curve has a gradually increasing portion 10 that indicates the normal combustion or burning of the fuel mixture within the cylinder. The smooth portion is interrupted by the occurrence of a large amplitude narrow width signal 11 which indicates the occurrence of knocking or detonation within the cylinder. The signal then decreases rather steeply and crosses the zero axis and reverses itself and trails off in a gradually decreasing portion 12. In the absence of detonation or knocking within the cylinder the curve would gradually reverse its direction and decrease as shown by the dotted line portion 13 of FIGURE 1. The prior art devices for determining the presence of knocking within an engine utilizes the increased amplitude of the first derivative signal when knocking occurs to determine the presence of knocking. This is accomplished by adjusting the threshold level of the apparatus to a value such as indicated by the line 14. This threshold value is adjusted so that it will exclude substantially all signals that indicate normal combustion within the engine. When knocking develops within the engine the first derivative signal will have the large amplitude peak 11 and this particular portion of the signal will exceed the threshold level and be passed on to the remainder of the measuring equipment. In many cases a second knock of small amplitude as shown by the dotted peak 15 occurs.

These prior devices utilized magneto-strictive devices for determining the rate of change of pressure within the engine. The rate of change is the same as the first derivative and thus they obtain an electrical signal that is directly related to the first derivative of the pressure within the engine. This electrical signal is then passed through an amplifier stage that has an adjustable threshold. This threshold is adjusted in accordance with the engine conditions existing at the time and the approximate octane rating of the fuel mixture being used. As explained above, the threshold is set so as to exclude all signals that indicate normal combustion and pass only high amplitude peaks that indicate the presence of detonation in the engine. In the case of a second peak 15 it is impossible to adjust the threshold to detect the knock.

Figure 2:
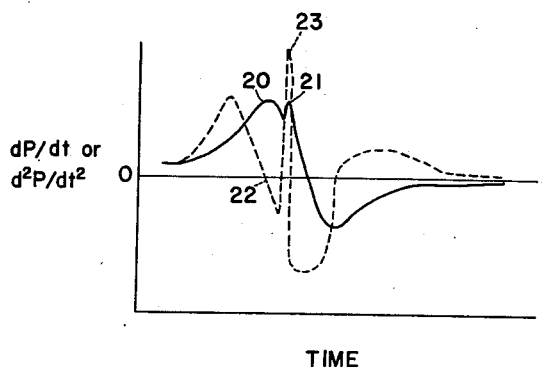
FIGURE 2 is a curve for a single engine cycle showing the change in both the first and second derivative with time with the two curves being superimposed so that the difference in magnitude of the two curves can be readily observed.

Referring now to FIGURE 2, there is shown both first and second derivative signals recorded with respect to time for a single combustion stroke of an engine. The first derivative signal shown in FIGURE 2 varies from that shown in FIGURE 1 since it actually changes direction at a point 20 and decreases in value prior to the occurrence of a knocking condition indicated by the rapidly rising peak 21. From an inspection of the amplitude of the peak 20 and the peak 21 which indicates knock, it is easily seen that in this particular case it would be difficult if not impossible to set the threshold of the prior art instrument. Thus, no knock would be indicated by the prior art instrument for the engine cycle shown in FIGURE 2.

Referring to the second derivative signal indicated by the dotted curve 22 it is seen that it has substantially the same amplitude as the first derivative at the peak of the normal combustion portion of the curve but that it increases very rapidly upon the occurrence of the knock signal 21 in the first derivative. This rapid increase in the second derivative signal results in a peak 23 having an amplitude which greatly exceeds the amplitude of the first derivative signal at the same point. Thus, if the difference between the first and second derivative signals were being utilized as an indication of the presence of knocking within the engine the knocking condition illustrated by the curves of FIGURE 2 would be easily detected.

Figure 3:
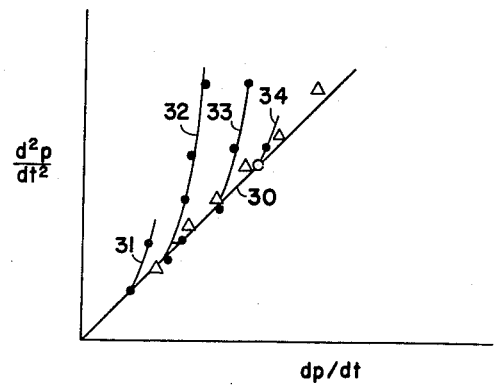
FIGURE 3 is a curve showing the linear relationship between the first derivative and the second derivative of the pressure for various types of fuels and engine conditions.

Referring now to FIGURE 3, there is shown a curve showing the relationship between the first and second derivatives. The two derivatives vary substantially linearly as shown by the curve 30 as long as the combustion is free of knock. Upon occurrence of knock, the relationship changes direction rapidly as indicated by curves 31–34 that relate to various types of fuel and fuel mixtures. Upon occurrence of knock it is seen that the curves depart from the linear relationship and that the second derivative of the pressure signal increases vary rapidly. As explained above this phenomenon is utilized in the method of this invention to determine the presence of a knocking condition within an engine.

Figure 4:
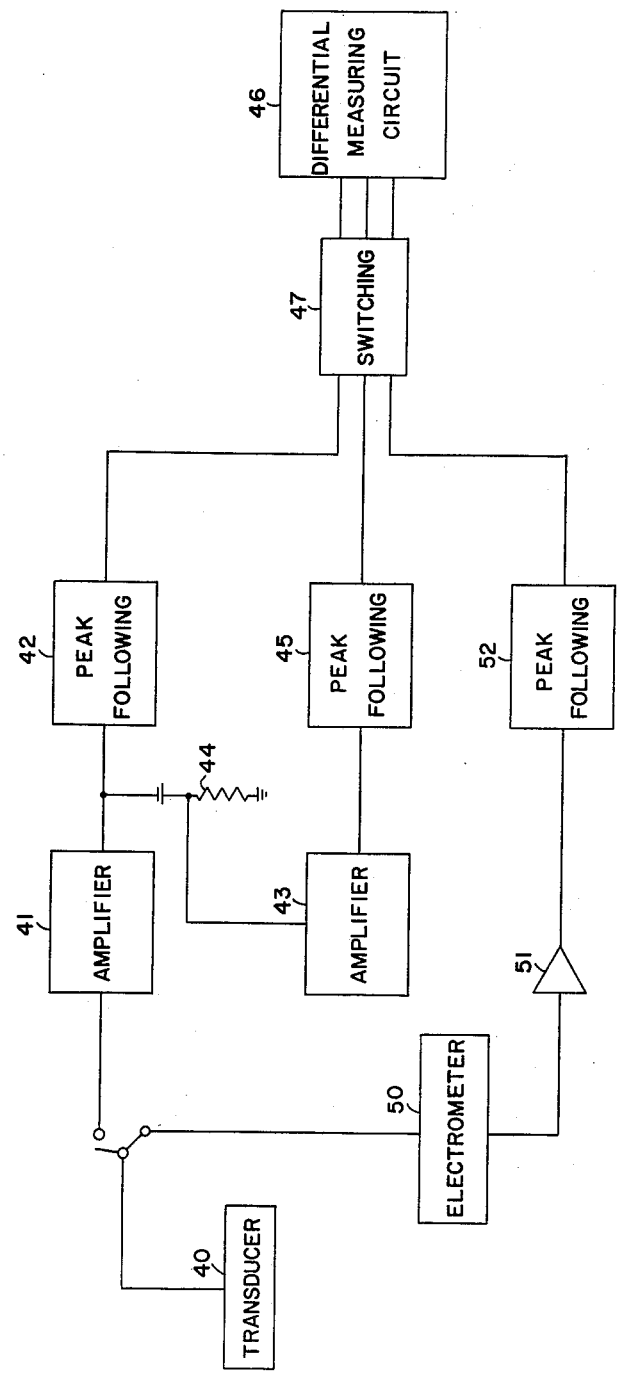
FIGURE 4 is a block diagram showing one apparatus suitable for practicing the method of this invention; and, FIGURES 5 to 8 are a series of oscillographic traces showing the first and second derivative signals superimposed on each other.

In FIGURE 4, there is shown a block diagram for a circuit suitable for performing the method of this invention. A transducer 40 is disposed in a cylinder of the engine and is capable of converting the pressure existing within a cylinder of an engine to an electrical signal related directly thereto. The transducer is preferably a piezo electrical crystal type of transducer that produces an electrical signal directly related to the force that distorts the crystal. This type of transducer is considerably different than the magneto-strictive type of transducer used in prior art systems. A magneto-strictive type transducer produces a signal that is related to the rate of change of the pressure within the cylinder as contrasted to the actual pressure. The transducer is coupled to an amplifier 41 that converts the transducer signal to the first derivative thereof. This conversion may be accomplished by utilizing a relatively high input impedance for the amplifier, for example, an impedance on the order of several thousand ohms, i.e., 200 to $700 \times 10^5$ ohms. The amplifier 41 is coupled to an amplifier 43 through a series resistance capacitance network 44 which differentiates the signal supplied by the amplifier 41 to obtain the second derivative thereof. The amplifiers 41 and 43 are both coupled to peak following devices 42 and 45, respectively. The peak following devices 42 and 45 are preferably designed to determine the peak value of the first and second derivative signals supplied thereto and have a time constant equal to several cycles of engine operation. Suitable devices for following the peak value of the signals from amplifiers 41 and 43 would be vacuum tube voltmeters. In addition, the peak following devices 42 and 45 should adjust the amplitude of their output signals so that they will be substantially equal when the engine is operating in a knock-free condition. The signals will then have substantially different values when a knock exists in the engine as explained below.

The two peak following devices 42 and 45 are coupled to a differential measuring circuit 46 through a switching means 47. This circuit may take various forms such as for example a differential amplifier or differential vacuum tube voltmeter. The circuit 46 should be capable of detecting the difference between the two output signals of devices 42 and 45 and supply an output signal or a meter indication of this difference. In addition, the circuit 46 should include suitable components to permit it to display or observe the value of selected signals.

The operation of the circuit shown in FIGURE 4 is believed to be self-evident from the above description. It can readily be appreciated that the circuit performs the required steps of the method of this invention. It first generates a signal that is directly related to the pressure within the cylinder of the engine and then differentiates this signal to provide both first and second derivative signals. The first and second derivative signals then have their amplitude adjusted so that they are substantially equal when the engine is running under knock-free conditions. The first and second derivative signals having the proper amplitude are then supplied to a differential measuring circuit to determine the difference between the two signals. This difference, as explained above, will be substantially zero when the engine is operating under knock-free conditions but will assume a substantial value at the instant a knocking condition develops within the engine. In order to prevent faulty readings caused by slight discrepancies between adjacent cycles of operation, the peak following devices 42 and 45 are provided with suitable circuits to average the derivative signals over a few cycles of operation. A suitable number of cycles would be for example 5 to 10.

Figure 5:
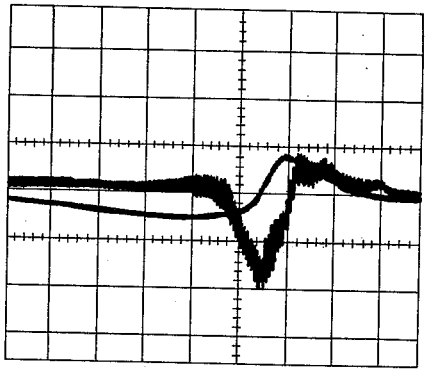

Referring now to FIGURES 5 to 8, there are shown the first and second derivative signals as recorded on an oscilloscope. FIGURE 5 illustrates an engine running on Toluene at 7.5 compression ratio with no knock. The difference between the first and second derivatives is clearly zero.

Figure 6:
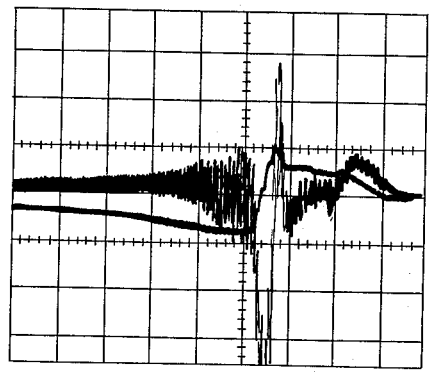
Figure 7:
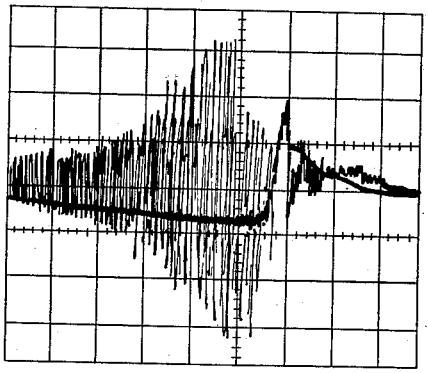

FIGURE 6 illustrates an engine running on isooctane with slight knock while FIGURE 7 illustrates isooctane with the engine set one compression ratio higher. The prior method would indicate substantially no knock for the conditions of FIGURE 6 and only a light knock for FIGURE 7. Obviously, the engine is knocking very heavily in FIGURE 7 and this is clearly indicated by the difference between the first and second derivatives.

Figure 8:
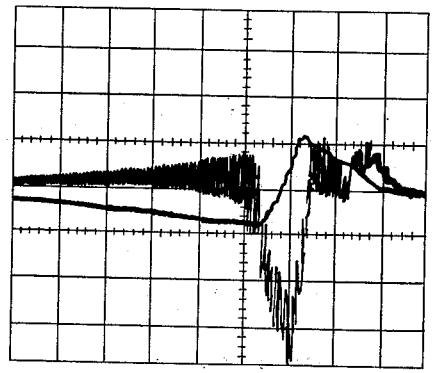

FIGURE 8 illustrates an engine set at a twelve-to-one compression ratio and running on benzene. This figure shows the absence of knock although the engine pounds heavily causing a high frequency signal to appear in the derivative signals. The presence of the high frequency signal would cause the prior device to indicate heavy knocking although FIGURE 8 clearly illustrates the absence of knock.

The above-described FIGURES 5 to 8 illustrate the accurate results obtained using the method and apparatus of this invention as contrasted to prior methods. These figures also show that the present method does not require adjustment when the fuel or engine conditions are changed. This results from the fact that the method of this invention does not require the setting of a threshold level. Thus high frequency signals resulting from pounding of the engine as shown in FIGURE 8 will not be indicated as knock.

Referring again to FIGURE 4, there is also shown a circuit for measuring and recording the peak pressure occurring in the cylinder during the combustion cycle. The transducer 40 is coupled to an electrometer 50 that amplifies the transducer signal without loading the transducer. The electrometer 50 is coupled to an amplifier 51 that is coupled to a peak following device 52 similar in construction to the peak following devices 42 and 45 described above. The peak following device 52 is coupled to the switching means 47 described above. The switching means preferably includes switching elements to permit one to selectively display the three signals representing pressure, and first and second derivatives of the pressure on the circuit 46. Also as explained above, the circuit 46 should include components required to display the difference between the first and second derivative signals. Of course, the circuit 46 can be formed by several individual instruments that are disposed to perform the above functions.

The above-described circuits provide a means whereby the pressure build-up within the engine cylinder during a combustion cycle may be observed. By observing the peak values of the pressure, and the first and second derivatives of the pressure an accurate analysis of the pressure build-up can be made. The analysis will indicate the differences in the combustion cycle when different fuels are used or when the engine conditions are changed. Thus, an accurate comparison can be made as to the merit of different fuels and engine conditions.

I claim as my invention:

1. A method for indicating detonation within a cylinder of an internal combustion engine comprising: generating a first electrical signal related to the rate of change of pressure in the cylinder as a result of combustion in the cylinder; generating a second electrical signal related to the rate of change of said first electrical signal; averaging the peak values of said first and second electrical signals over several cycles of said engine, generating third and fourth electrical signals related to the averaged peak values of said first and second electrical signals and measuring the difference between third and fourth electrical signals.

2. An apparatus for measuring detonation within a cylinder of an internal combustion engine, said apparatus comprising: transducer means disposed in the cylinder to produce an output signal related to the pressures within the cylinder; said transducer being coupled to a first circuit means, said first circuit means being disposed to determine the first derivative of the output signal of said transducer; a second circuit means coupled to said first circuit means and disposed to determine the second derivative of the output signal of the transducer means; said first and second circuit means being coupled to a difference determining circuit to determine the difference between said first and second derivatives.

References Cited by the Examiner
UNITED STATES PATENTS

| | | | |
|---|---|---|---|
| 2,304,740 | 12/42 | Minton | 333—19 X |
| 2,337,522 | 12/43 | Eldredge | 73—35 |
| 2,448,322 | 8/48 | Piety | 73—35 |
| 2,794,173 | 5/57 | Ramey. | |
| 2,895,111 | 7/59 | Rothe | 333—19 X |
| 3,054,051 | 9/62 | Hayes | 333—19 X |

RICHARD C. QUEISSER, *Primary Examiner.*

DAVID SCHONBERG, *Examiner.*